Nov. 23, 1943.  R. T. ATKINSON  2,334,856
COMBINED SUN VISOR AND AERIAL FOR VEHICLES
Filed Jan. 4, 1941
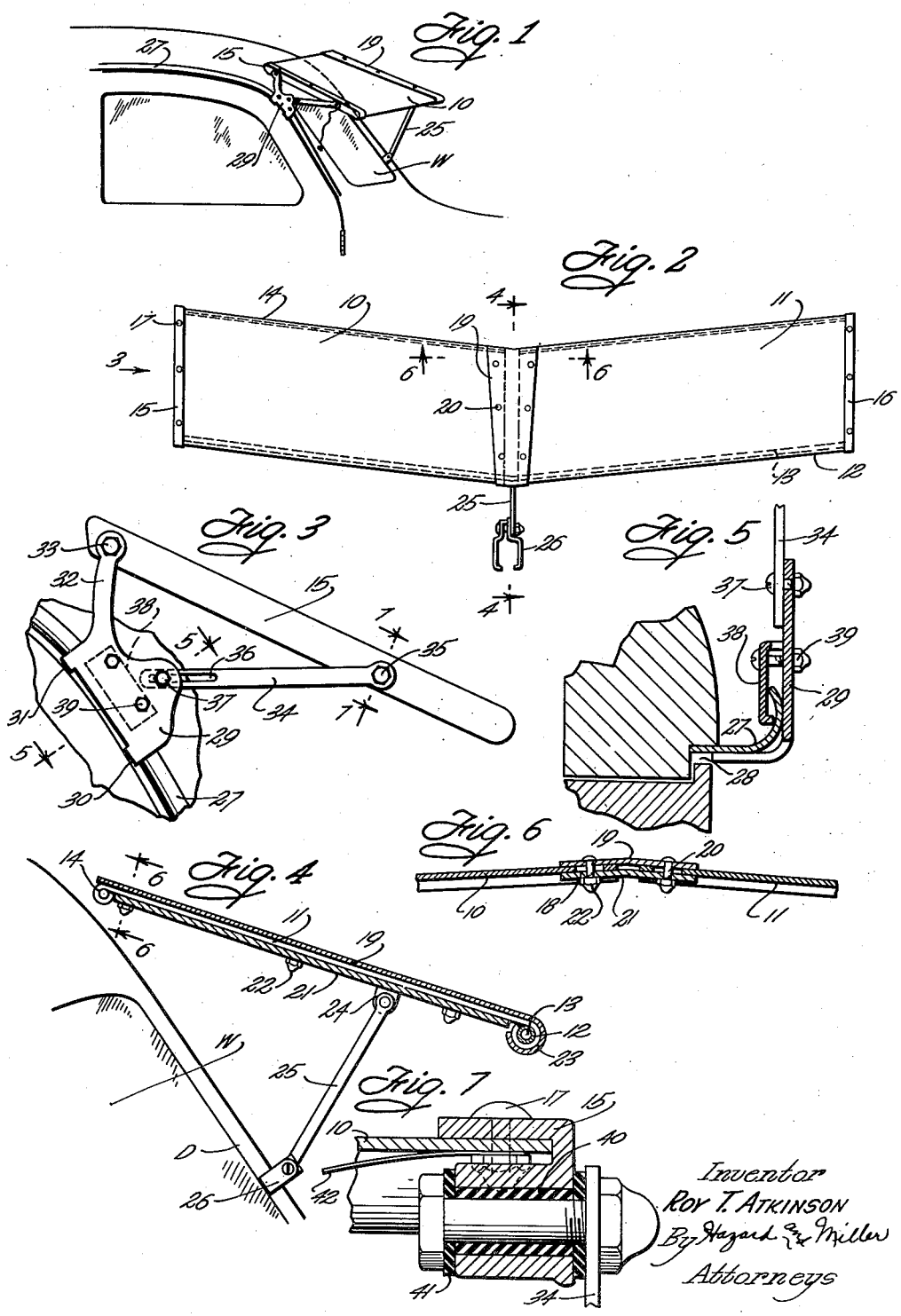
Inventor
Roy T. Atkinson
By Hazard & Miller
Attorneys Patented Nov. 23, 1943

2,334,856

UNITED STATES PATENT OFFICE 2,334,856

COMBINED SUN VISOR AND AERIAL FOR VEHICLES

Roy T. Atkinson, Los Angeles, Calif.

Application January 4, 1941, Serial No. 373,084

6 Claims. (Cl. 296—95)

This invention relates to improvements in combined sun visors and aerials for vehicles.

One object of the invention is to provide an improved sun visor for use on vehicles such as automobiles of the closed car or sedan type, but which may be employed on automobiles having other body constructions if desired.

Specifically, an object of the invention is to provide a sun visor which is adjustable not only as to length but also as to angularity so that by means of the adjustment the visor can be mounted on various makes of automobiles even though the body contours of such automobiles vary considerably.

Another object of the invention is to provide a sun visor for vehicles which is readily adjustable as to angularity, length, and as to its position with respect to the windshield but which is of sturdy construction and which will not loosen or rattle after having once been properly installed.

Another object of the invention is to provide a combined sun visor and aerial for automobiles wherein the body of the sun visor is formed of a suitable metal that may serve as an aerial for the automobile radio, the construction being characterized by the fact that the portions of the visor that act as the aerial are electrically insulated from the body of the vehicle. With the sun visor thus electrically insulated from the body of the vehicle and serving as an aerial for the automobile radio the aerial is not only of adequate size but is very conveniently arranged for reception without interference of surrounding objects on the automobile.

With the foregoing and other objects in view, which will be made manifest in the following detailed description and specifically pointed out in the appended claims, reference is had to the accompanying drawing for an illustrative embodiment of the invention, wherein:

Figure 1 is a partial view in perspective illustrating a portion of the body of a sedan type automobile with the combined sun visor and aerial illustrated in installed position thereon:

Fig. 2 is a top plan view of the combined sun visor and aerial embodying the present invention;

Fig. 3 is a partial view in end elevation and may be considered as having been taken in the direction of the arrow 3 upon Fig. 2;

Fig. 4 is a longitudinal section taken substantially upon the line 4—4 upon Fig. 2 but showing the brace that may be optionally employed, attached to the division strip of the windshield;

Fig. 5 is a sectional view taken substantially upon the line 5—5 upon Fig. 3;

Fig. 6 is a partial view in vertical section taken substantially upon the line 6—6 upon Fig. 2; and Fig. 7 is a partial view in vertical section taken substantially upon the line 7—7 upon Fig. 3.

Referring to the accompanying drawing wherein similar reference characters designate similar parts throughout, the sun visor comprises two body sections of sheet metal such as cold rolled steel. These sections are generally designated at 10 and 11. The forward edge of each section is rolled or curled as indicated at 12 around a rod or hollow tube 13. The rear edge of each section is similarly rolled or curled around a wire as at 14. The wire sections need not extend beyond the ends of their respective body sections 10 and 11 but in the preferred form of construction the rod or tube 13 around which the forward edges of the body sections are rolled extends from end to end of the completed combined sun visor and aerial.

At the outer ends of the sun visor there are brackets 15 and 16 which are angular in cross section and receive the outer ends of the sections 10 and 11. Bolts 17 extend through the brackets and into apertures in the edges of the sections 10 and 11 and serve to firmly fasten the brackets thereto. The inner ends of the body sections 10 and 11 are provided with slots 18 and a cover plate 19 bridges whatever gap there may be between the inner ends of the body sections 10 and 11. This cover plate has threaded bolts 20 thereon which are extended through the slots 18 and into apertures in a lower plate 21. They are equipped with nuts 22. As clearly shown in Fig. 4 the cover plate 19 has its forward end rolled as at 23 to extend around the rolled or curled forward edges of the body sections 10 and 11.

The lower plate 21 may optionally have a knuckle 24 formed on its underside to which is pivotally attached a brace 25 having a clamp 26 designed to engage and to be clamped on the division strip D of automobiles equipped with V-type or divided windshields. If the automobile to which the visor is to be applied does not have such a division strip D, knuckle 24, brace 25, and the clamp 25 may be omitted. Where employed, however, the pivot pin that pivotally connects the brace 25 with the knuckle 24 is surrounded with a bushing of electrically insulating material so as to electrically insulate brace 25 from the body of the visor. The brackets 15 and 16 are designed to be connected to the body of the vehicle and to this end advantage is taken of the presence of the drip rail on the conventional sedan or closed type automobile as now manufactured. This drip rail is usually provided by a section of sheet metal indicated at 27 which extends along the edge of the top and is finally bent downwardly adjacent the windshield immediately over the door opening as shown on Fig. 1. There is usually a small space present, indicated at 28, between the attaching portion of the drip rail and the top edge of the door. For each of the brackets 15 and 16 there is provided a clamping member 29 having preferably two spaced lugs 30 and 31 adapted to be positioned against the underside of the drip rail 27 and if necessary to enter the space 28 as clearly shown in Fig. 5. The clamping member 29 has an upwardly extending arm 32 which is pivotally connected to its respective bracket as by a bolt or pivot pin 33. The clamping member 29 is also equipped with a brace 34 which has its forward end pivotally connected to its respective bracket as at 35. The rear end of the brace 34 is slotted as at 36 to receive a bolt 37. This provides for some adjustment of the effective length of the brace 34 to adjust the position of the sun visor properly with respect to the windshield W.

On the inner face of each clamping member 29 there is disposed a cooperative clamping member 38 which is of such length and size that it will be positioned against the inner surface of the drip rail 27. It is designed to be tightened as by bolts 39. The insulating bushing that may be employed at the pivot connection between brace 25 and knuckle 24 and at 33 and 35 as illustrated in Fig. 7. The bushing of insulating material, indicated at 40, merely surrounds the bolt or pivot pin and extends entirely through the portion of the construction in which the pivot pin or bolt is disposed. End washers 41 may be positioned at both ends of the insulating bushing. In this way the combined sun visor and aerial is electrically insulated at all points from the body of the automobile. A lead-in wire such as is indicated at 42, may be attached, such as by any of the bolts 17 and may be lead into the body of the vehicle to the radio. This may be accomplished by means of a hole provided therefor equipped with a suitable bushing and jamb nuts such hole being indicated in one of the posts at the side of the windshield as indicated in Fig. 1. In some types of automobiles small rod-like aerials are rotatably adjustable from the back of the division strip D and may be optionally swung upwardly over the top of the vehicle or caused to assume a position lying near the division strip. In this type of construction the mounting of the visor over the windshield interferes with such movement of the aerial and when this occurs the aerial may be removed and the lead-in wire 42 run in through the aperture left or provided for swinging the aerial into operative or inoperative positions.

A feature of the construction resides in the adjustability of the sun visor and aerial both with regard to length and angularity. Such adjustment is accomplished by the slots 18. By loosening the nuts 22 the visor can be lengthened or shortened as desired by means of these slots and if the angularity of the visor must be adjusted in order to properly fit the shape of the body this can likewise be accomplished by means of these slots. In many instances, the angularity merely requires a springing of the tube or rod 13 and when so sprung, the construction is kept taut avoiding rattling. In other instances it may be necessary to rotate the tube or rod 13 within the curled edges at the forward sides of the body sections 10 and 11 to secure the necessary adjustment.

The improved combined sun visor and aerial is highly advantageous in that for aerial purposes it is of adequate size and is positioned in such a position with relation to the body of the automobile as not to be interfered with by surrounding structure. I find that with the use of a single sun visor embodying the present invention as an aerial I can secure better reception than with two whip-type aerials now in general use, other conditions being the same.

From the above-described construction it will be appreciated that an improved sun visor for vehicles has been provided having advantageous features or adjustment and which may be very advantageously employed as an aerial for the automobile radio.

Various changes may be made in the details of construction without departing from the spirit or scope of the invention as defined by the appended claims.

I claim:

1. A sun visor for vehicles comprising a pair of visor body sections, each section being of a length to extend from one side of a vehicle to substantially the center thereof, a cover plate overlying the adjacent ends thereof, a lower plate positioned beneath the adjacent ends of said sections, means extending through slots in the adjacent ends of said sections for securing the cover plate, lower plate, and said sections together but permitting angular and lengthwise adjustment of the sections with respect to each other, and means secured to the outer ends of the section for adjustably mounting the visor on a vehicle.

2. A sun visor for vehicles comprising a pair of visor body sections, each section being of a length to extend from one side of a vehicle to substantially the center thereof, a cover plate overlying the adjacent ends thereof, a lower plate positioned beneath the adjacent ends of said sections, means extending through slots in the adjacent ends of said sections for securing the cover plate, lower plate, and said sections together but permitting angular and lengthwise adjustment of the sections with respect to each other, and means secured to the outer ends of the section for adjustably mounting the visor on a vehicle, the forward edges of the sections being rolled and the forward end of the cover plate being rolled about the adjacent portions of the rolled edges of the visor sections.

3. A sun visor for vehicles comprising a pair of visor body sections, each section being of a length to extend from one side of a vehicle to substantially the center thereof, a cover plate overlying the adjacent ends thereof, a lower plate positioned beneath the adjacent ends of said sections, means extending through slots in the adjacent ends of said sections for securing the cover plate, lower plate, and said sections together but permitting angular and lengthwise adjustment of the sections with respect to each other, means secured to the outer ends of the section for adjustably mounting the visor on a vehicle, and a brace pivotally secured to the lower plate having clamping means for attaching it to the division strip of a divided windshield.

4. A sun visor for vehicles comprising a pair of visor body sections, each section being of a length to extend from one side of a vehicle to substantially the center thereof, the forward edges of said sections being rolled, angular rod-like means extending through the rolled forward edges of both sections for assisting in maintaining said sections in horizontal alignment, said means being capable of rotating within the rolled forward edges of said sections to effect angular adjustment of said sections, and means adjacent the outer ends of said sections for mounting said sections upon a vehicle.

5. A sun visor for vehicles comprising a pair of visor body sections, each section being of a length to extend from one side of a vehicle to substantially the center thereof, the forward edges of said sections being rolled, means extending through the rolled forward edges of both sections for assisting in maintaining said sections in horizontal alignment, and means adjacent the outer ends of said sections for mounting said sections upon a vehicle, a cover plate positioned over the adjacent ends of said sections, said cover plate having a rolled forward end rolled about the adjacent portions of the rolled forward edges of said sections.

6. A sun visor for vehicles comprising a pair of visor body sections, each section being of a length to extend from one side of a vehicle to substantially the center thereof, the forward edges of said sections being rolled, angular rod-like means extending through the rolled forward edges of both sections for assisting in maintaining said sections in horizontal alignment, said means being rotatable within said rolled forward edges of said sections to effect angular adjustment, means adjacent the outer ends of said sections for mounting said sections upon a vehicle, a cover plate positioned over the adjacent ends of said sections, means on the cover plate extending through the adjacent ends of said sections for securing the sections and cover plate together, said cover plate having a rolled forward end rolled about the adjacent portions of the rolled forward edges of said sections.

ROY T. ATKINSON.